United States Patent
Yaseen et al.

(10) Patent No.: US 9,953,331 B2
(45) Date of Patent: *Apr. 24, 2018

(54) EXTENSIBILITY FOR SALES PREDICTOR (SPE)

(71) Applicant: ORACLE INTERNATIONAL CORPORATION, Redwood Shores, CA (US)

(72) Inventors: Rahim Mohamed Yaseen, Redwood City, CA (US); Hetal J. Shah, Acton, MA (US); Manish Bhatia, Bangalore (IN); Chethan Rathna Nagarajan, Bangalore (IN); Jayashree Manjunath, Acton, MA (US); Krishna Murty Mulukutla, Coppell, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,764

(22) Filed: Nov. 28, 2016

(65) Prior Publication Data

US 2017/0076305 A1  Mar. 16, 2017

Related U.S. Application Data

(63) Continuation of application No. 13/934,065, filed on Jul. 2, 2013, now Pat. No. 9,508,083.

(Continued)

(51) Int. Cl.
G06Q 30/02  (2012.01)
G06F 17/30  (2006.01)

(52) U.S. Cl.
CPC ......... *G06Q 30/0202* (2013.01); *G06F 17/30* (2013.01)

(58) Field of Classification Search
CPC ........... G06F 17/30-17/30997; G06Q 30/0202
(Continued)

(56) References Cited

U.S. PATENT DOCUMENTS 5,970,464 A  10/1999  Apte et al.
6,412,012 B1  6/2002  Bieganski et al.
(Continued)

FOREIGN PATENT DOCUMENTS

CN  1773453 A  5/2006
CN  101021930 A  8/2007
WO  WO 2012/037578  3/2012

OTHER PUBLICATIONS

Aulbach et al., Multi-Tenant Databases for Software as a Service: Schema-Mapping Techniques. pp. 1195-1206. SIGMOD '08, Jun. 9-12, 2008, Vancouver, BC, Canada.*

(Continued)

*Primary Examiner* — Peter H Choi
*Assistant Examiner* — Alissa D Karmis
(74) *Attorney, Agent, or Firm* — Vista IP Law Group, LLP

(57) ABSTRACT

Disclosed are methods and systems for implementing extensibility in sales prediction engines. An extensibility framework may be used to modify the metadata schema of the data used by the sales prediction engine to account for extended attributes and entities. The sales prediction engine is also modified to recognize the extended attributes and entities so that a user will be able to create new rules and train new models based on the extended attributes and entities.

20 Claims, 7 Drawing Sheets

Related U.S. Application Data

(60) Provisional application No. 61/667,086, filed on Jul. 2, 2012, provisional application No. 61/786,603, filed on Mar. 15, 2013.

(58) Field of Classification Search
USPC .......... 705/7.31; 717/113; 707/803, 812; 718/100
See application file for complete search history.

(56) References Cited

U.S. PATENT DOCUMENTS

| | | | |
|---|---|---|---|
| 6,583,673 | B2 | 6/2003 | Tarek et al. |
| 7,216,087 | B2 | 5/2007 | Thompson et al. |
| 7,546,248 | B2 | 6/2009 | Ellison et al. |
| 7,779,039 | B2* | 8/2010 | Weissman .......... G06F 17/30595 707/793 |
| 7,822,647 | B1 | 10/2010 | Mussman et al. |
| 7,899,707 | B1 | 3/2011 | Mesaros |
| 7,979,305 | B2 | 7/2011 | Thompson et al. |
| 8,321,303 | B1 | 11/2012 | Krishnamurthy et al. |
| 8,762,227 | B1 | 6/2014 | Fox |
| 2002/0004739 | A1 | 1/2002 | Elmer |
| 2002/0029376 | A1 | 3/2002 | Ambrose et al. |
| 2002/0111981 | A1* | 8/2002 | Melli .............. G06F 17/30557 718/100 |
| 2002/0147645 | A1 | 10/2002 | Alao et al. |
| 2003/0078788 | A1 | 4/2003 | Sussman et al. |
| 2003/0154197 | A1 | 8/2003 | Millet |
| 2003/0236690 | A1 | 12/2003 | Johnston-Watt |
| 2005/0071345 | A1* | 3/2005 | Lin .................. G06F 17/30595 |
| 2005/0097187 | A1 | 5/2005 | Thompson et al. |
| 2006/0004815 | A1 | 1/2006 | Murata |
| 2006/0116921 | A1 | 6/2006 | Shan |
| 2007/0011187 | A1 | 1/2007 | Chitgupakar et al. |
| 2007/0100680 | A1 | 5/2007 | Kumar |
| 2008/0103876 | A1 | 5/2008 | Armstrong et al. |
| 2008/0120129 | A1 | 5/2008 | Seubert et al. |
| 2008/0140602 | A1 | 6/2008 | Roth et al. |
| 2008/0162487 | A1 | 7/2008 | Richter |
| 2009/0030864 | A1 | 1/2009 | Pednault |
| 2009/0094291 | A1 | 4/2009 | Yalamanchi |
| 2009/0222877 | A1 | 9/2009 | Diehl et al. |
| 2009/0234710 | A1 | 9/2009 | Belgaied Hassine |
| 2009/0248460 | A1 | 10/2009 | Johnson |
| 2009/0254423 | A1 | 10/2009 | Ellison et al. |
| 2009/0254971 | A1 | 10/2009 | Herz |
| 2010/0042574 | A1 | 2/2010 | Dewar |
| 2010/0114663 | A1* | 5/2010 | Casas ................ G06Q 10/067 705/7.31 |
| 2010/0114665 | A1 | 5/2010 | Stengard |
| 2010/0138249 | A1 | 6/2010 | Rackham |
| 2010/0280882 | A1 | 11/2010 | Faith et al. |
| 2010/0324985 | A1 | 12/2010 | Kumar et al. |
| 2011/0153576 | A1* | 6/2011 | Figus .............. G06F 17/30595 707/692 |
| 2011/0154253 | A1 | 6/2011 | Lehr et al. |
| 2011/0219046 | A1* | 9/2011 | Nesmyanovich ....... G06F 17/30 707/812 |
| 2011/0238709 | A1* | 9/2011 | Liu ................ G06F 17/30575 707/803 |
| 2011/0246260 | A1 | 10/2011 | Gilbert et al. |
| 2012/0110566 | A1* | 5/2012 | Park ................ G06F 9/4451 717/174 |
| 2012/0150922 | A1* | 6/2012 | Yalamanchi ...... G06F 17/30507 707/812 |
| 2012/0166421 | A1 | 6/2012 | Cammert et al. |
| 2012/0185821 | A1 | 7/2012 | Yaseen et al. |
| 2012/0278091 | A1 | 11/2012 | Yaseen et al. |

OTHER PUBLICATIONS

International Search Report dated Apr. 5, 2012 for related International Application No. PCT/US2011/052229.
Written Opinion of the International Searching Authority dated Apr. 5, 2012 for related International Application No. PCT/US2011/052229.
Non-final Office Action dated Nov. 6, 2013 for related U.S. Appl. No. 13/236,629.
Final Office Action dated Apr. 29, 2014 for related U.S. Appl. No. 13/236,629.
Extended European Search Report dated Feb. 13, 2014 for related EP Patent Application No. 11790811.1.
International Search Report dated Jul. 28, 2014 for corresponding International Patent Application No. PCT/US2013/049152, 8 pages.
Non-final Office Action dated Sep. 9, 2014 for related U.S. Appl. No. 13/236,629.
Non-final Office Action dated Nov. 6, 2014 for related U.S. Appl. No. 13/866,946.
European Examination Report dated Nov. 17, 2014 for related EP Patent Application No. 11790811.1, 4 pages.
Final Office Action dated Mar. 26, 2015 for related U.S. Appl. No. 13/866,946.
Non-final Office Action dated Apr. 9, 2015 for related U.S. Appl. No. 13/934,065.
Final Office Action dated Apr. 17, 2015 for related U.S. Appl. No. 13/236,629.
Non-final Office Action dated Aug. 7, 2015 for related U.S. Appl. No. 13/866,946.
Final Office Action dated Oct. 27, 2015 for related U.S. Appl. No. 13/934,065.
Final Office Action dated Nov. 30, 2015 for related U.S. Appl. No. 13/866,946.
Non-final Office Action dated Dec. 11, 2015 for related U.S. Appl. No. 13/236,629.
Notification of the First Office Action dated Dec. 24, 2015 for related Chinese Patent Application No. 201180052118.3.
Notice of Allowance and Fee(s) due dated Jul. 5, 2016 for related U.S. Appl. No. 13/934,065.
Final Office Action dated Jul. 13, 2016 for related U.S. Appl. No. 13/236,629.
Non-final Office Action dated Aug. 18, 2016 for related U.S. Appl. No. 13/866,946.
Notification of the Second Office Action dated Jul. 29, 2016 for related Chinese Patent Application No. 201180052118.3.
Notification of the Third Office Action dated Nov. 2, 2016 for related Chinese Patent Application No. 201180052118.3.
Final Office Action dated Dec. 14, 2016 for related U.S. Appl. No. 13/866,946.
Non-final Office Action dated Jan. 30, 2017 for related U.S. Appl. No. 13/236,629.
Notification of the First Office Action dated Mar. 15, 2017 for corresponding Chinese Patent Application No. 201380041798.8, 10 pages.
Rejection Decision dated May 4, 2017 for related Chinese Patent Application No. 201180052118.3.
Summons to attend oral proceedings pursuant to Rule 115(1) EPC dated Apr. 12, 2017 for related EP Patent Application No. 11790811.1, 10 pages.
Notification of the Second Office Action dated Aug. 31, 2017, for related Chinese Patent Application No. 201380041798.8, 7 pages.

* cited by examiner

EXTENSIBILITY FOR SALES PREDICTOR (SPE)

CROSS-REFERENCE TO RELATED APPLICATIONS

This application is a continuation of U.S. patent application Ser. No. 13/934,065, filed on Jul. 2, 2013, which claims the benefit of priority to U.S. Provisional Patent Application Ser. No. 61/667,086, entitled "Extensibility for Sales Predictor (SPE)", filed Jul. 2, 2012, and U.S. Provisional Patent Application Ser. No. 61/786,603, entitled "Extensibility for Sales Predictor (SPE)", filed Mar. 15, 2013, which are hereby incorporated by reference in their entireties.

BACKGROUND

Improving the productivity of a sales force is a challenge. By identifying patterns of sales successes and failures, sales representatives can work to replicate or avoid similar efforts and thereby avoid wasting cycles of cold-calling and uneventful sales activities. Sales patterns can be observed and identified. These patterns offer a window into future buying behavior.

But sales patterns are not readily identifiable to the sale and marketing organization, and therefore it is difficult for the organization to take action to improve sales success. Typical multidimensional analysis of the various factors impacting purchasing by industry, geography, customer size, install base, and the like are often too time-consuming for the sales and marketing groups to undertake.

Sales predictor engines (SPE) may be used to create rules and models that will help predict and recommend potential sales based on customer attributes. SPE software will typically support common attributes that sales analysts may use to create rules and models for sales prediction. However, it is often desirable to include additional attributes that may not be supported by the SPE out of the box. For example, a sales analyst selling in China may wish to implement a "province" attribute in order to create rules and sales prediction models for Chinese customers, whereas such an attribute would not be needed for other customers, such as those in the United States.

Therefore, a need exists for being able to implement extended attributes and entities for a sales predictor engine.

SUMMARY

The present application is directed to an approach for providing extensibility to sales prediction mechanisms. In some embodiments, the present invention relates to extending and modifying software functionality, and, more particularly, to using one or more patterns for an enterprise software object to express desired functionality and configuration, and to generate the enterprise software object using the patterns, for a sales prediction mechanism.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

Figure 1:
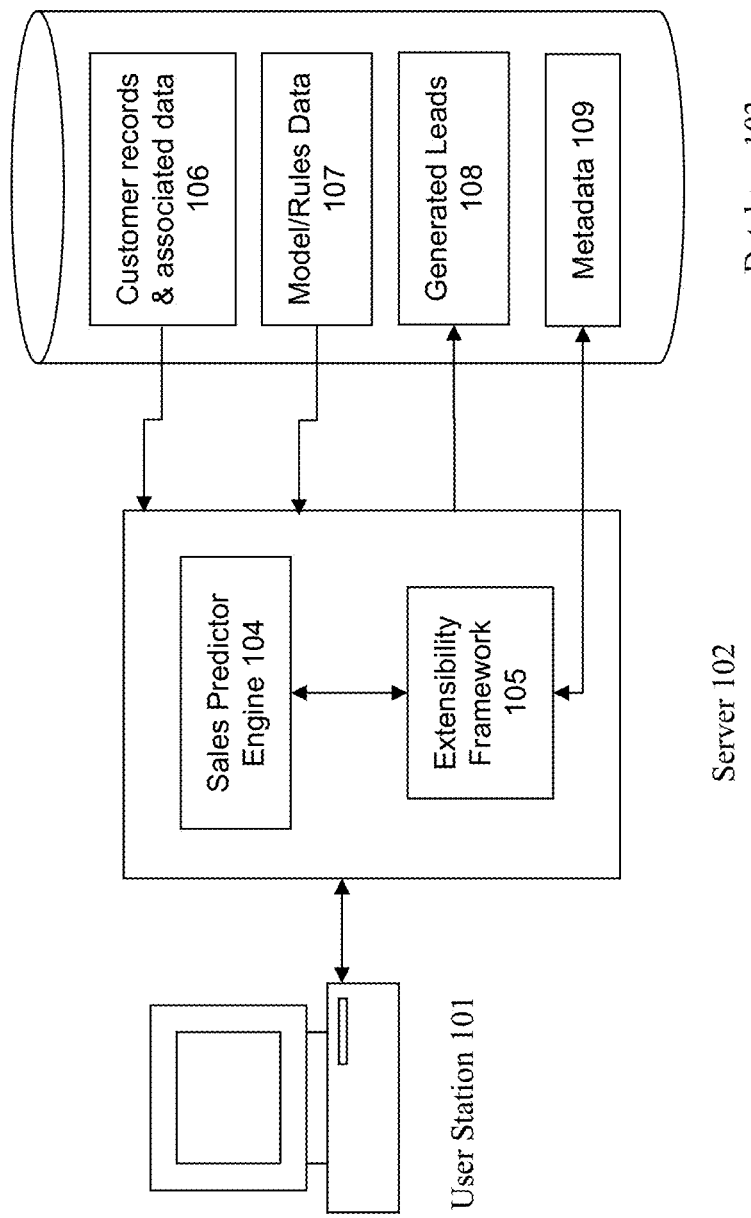
FIG. 1 illustrates an architecture of a system for implementing extensibility for a sales predictor engine according to some embodiments of the invention.

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

Predictive analysis can be used to improve the productivity of a sales force by identifying patterns of successes and failures. By observing and analyzing past sales patterns, insight into possible future buying behavior may be gained. A predictive model can be built that uses information about existing business customers to characterize the businesses that are likely to buy a particular product. In some embodiments, experienced sales analysts may also write rules identifying characteristics of customers that are more likely to lead to a sale of a particular product.

Sales predictor engines (SPE) provide a software solution for creating rules and models for predicting and recommending potential sales based on customer attributes. SPE software typically contains common attributes that sales analysts may use to create rules and models for sales prediction. However, sales analysts for different products or regions may desire different customer attributes and entities to be available that are not available in the out of the box SPE solution. For example, a sales analyst selling a certain product may find it desirable to include additional attributes as part of a model for sales prediction, beyond the attributes that were included in the original SPE.

While sales analysts are familiar with the issues and concepts concerning sales prediction, they often do not have expertise in software development and creation. The present application is directed to an approach for providing extensibility to sales prediction mechanisms that may be easily used by sales analysts.

According to some embodiments, the SPE supports extensibility in terms of learning on a new extensible attribute of an existing entity or on a new custom entity. In some embodiments, these extensible attributes and custom entities may be part of a regression model, such as an RTD (Oracle Real Time Decisions BI product) likelihood model, and/or a clustering model, such as an ODM (Oracle Data Mining) sales cycle and revenue model. In some embodiments, the SPE UI contains a Select Metadata UI used to specify attributes and entities for training, and a Rules UI for creation and/or editing of new rules. The extensible attribute/custom entity may be displayed to the user in the Select Metadata UI and the Rules UI in the SPE Application where they may be selected for training or rules definition.

The SPE may support generating recommendations and/or explanations using custom entities and/or attributes that are top correlators. The SPE portlet may show the extensible attribute and/or custom entity attribute in the case of sufficient data, and generate reports using entity objects (EO) or view objects (VO) to show the extended attributes and/or custom entity attributes. In some embodiments, the SPE may also support extensibility in terms of Extended Metrics (Past Purchasing and Servicing) support and Multi-tenancy support for extensibility.

In some embodiments, the SPE system may use a transactional system (such as Oracle Fusion Online Transaction Processing (OLTP)). Other embodiments may use a transactional system in conjunction with a data warehouse.

An example method and mechanism to perform sales prediction was described in U.S. patent application Ser. No. 13/236,629, entitled "Sales Prediction and Recommendation System", filed on Sep. 19, 2011, which is hereby incorporated by reference in its entirety.

An example framework to provide extensibility for enterprise applications was described in U.S. patent application Ser. No. 13/236,022, "PATTERN-BASED CONSTRUCTION AND EXTENSION OF ENTERPRISE APPLICATIONS IN A CLOUD COMPUTING ENVIRONMENT", filed on Sep. 19, 2011, which is hereby incorporated by reference in its entirety.

The extensibility framework is configured to support the SPE by allowing for the addition and modification of extensible fields and custom entities at runtime. The extensibility framework further is able to query the SPE to determine whether the entity has been extended, and to update the SPE data model with knowledge of the extended attributes and entities so that they can be used for defining rules and training models.

The extensibility framework is also configured to update the database at runtime with details of the extended information, which may include an extended attribute for an existing entity, or an added custom entity. The SPE may generate reports based on the extended attributes/entities using EO/VOs.

For the use case of using these extended attributes/custom entities after the end user already having some previous learning, learning may be started fresh, wherein the previous learning is reset, so that the custom attributes/entities are considered along with the other attributes. Alternatively, incremental learning may be done with the new attributes. Depending on the data, it may take a while before the new attributes show up in the explanations or the top correlators.

Architecture

FIG. 1 illustrates an architecture of a system for implementing extensibility for a sales predictor engine according to some embodiments of the invention. To generate leads and recommendations, the users operate the system at user station 101 to access the sales predictor engine 104 on a server 102.

The information used the by the sales predictor engine 104 is stored in database 103, which may include customer records, lead, and revenue data 106 and model/rules data 107. Sales predictor engine 104 may be model-based or rules-based. In some embodiments, sales predictor engine 104 may use both models and rules. The user at user station 101 uses sales predictor engine 104 to create rules and/or train models to be stored in model/rules data 107, and to apply models and/or rules from model/rules data 107 to customer data 106 in order to create leads, reports, and/or explanations that are stored in generated leads 108.

Database 103 also contains metadata information 109, which specifies extended attributes for the entities found in customer data 106, as well as custom entities. For example, in some embodiments, the customer entity may have a plurality of out of the box attributes (e.g., "name," "country," "industry," "annual revenue"). However, the user may wish to be able to make use of additional attributes for the customer entity not included with the out of the box SPE. These extended attributes may be added to the customer entity (e.g., "number of employees," "name of CEO"), which will be reflected in the metadata schema in metadata 109. The metadata schema is updated when new extended attributes and new custom entities are added.

In order to be able extend the attributes of existing entities such as the customers in customer data 106, or to create new custom entities, server 102 contains an extensibility framework 105. Extensibility framework 105 is configured to receive inputs specifying extended attributes and entities, and to edit metadata 109 based upon those inputs. For example, in some embodiments, a sales analyst may wish to add a "number of employees" attribute to the customer entity in order to generate rules and/or models, even though the out of the box system contains no such attribute. The extensibility framework 105 may contain an interface allowing the sales analyst to input the new attribute, and would then edit the metadata schema in metadata 109 accordingly. Extensibility framework 105 may also contain a user interface to allow a user to specify new custom entities.

In addition to editing metadata 109, extensibility framework 105 interfaces with sales predictor engine 104, so that the sales predictor engine 104 will recognize the new entities and attributes, and be able to use them to define new rules or train new models from which to generate leads and recommendations. For example, sales predictor engine 104 may include a Rules UI, where the user may select customer attributes to be used in defining new rules. When extensibility framework 105 adds a new extended attribute to the customer entity, the extensibility framework 105 will also interface with the sales predictor engine 104 so that the new attribute will be selectable using the rules UI.

The user station 101 comprises any type of computing station that may be used to operate or interface with the application server. Examples of such user stations include for example, workstations, personal computers, laptop computers, or remote computing terminals. The user station 101 may comprise a display device, such as a display monitor or screen, for displaying interface elements and report data to the user. The user station 101 may also comprise one or more input devices for the user to provide operational control over the activities of the system, such as a mouse, touch screen, keypad, or keyboard. The users of the user station 101 correspond to any individual, organization, or other entity that uses system to access the sales prediction engine or extensibility framework on server 102.

The database 103 corresponds to any type of computer readable mediums or storage devices. The computer readable storage devices comprise any combination of hardware and software that allows for ready access to the data within the database. For example, the computer readable storage device could be implemented as computer memory or disk drives operatively managed by an operating system.

Figure 2A:
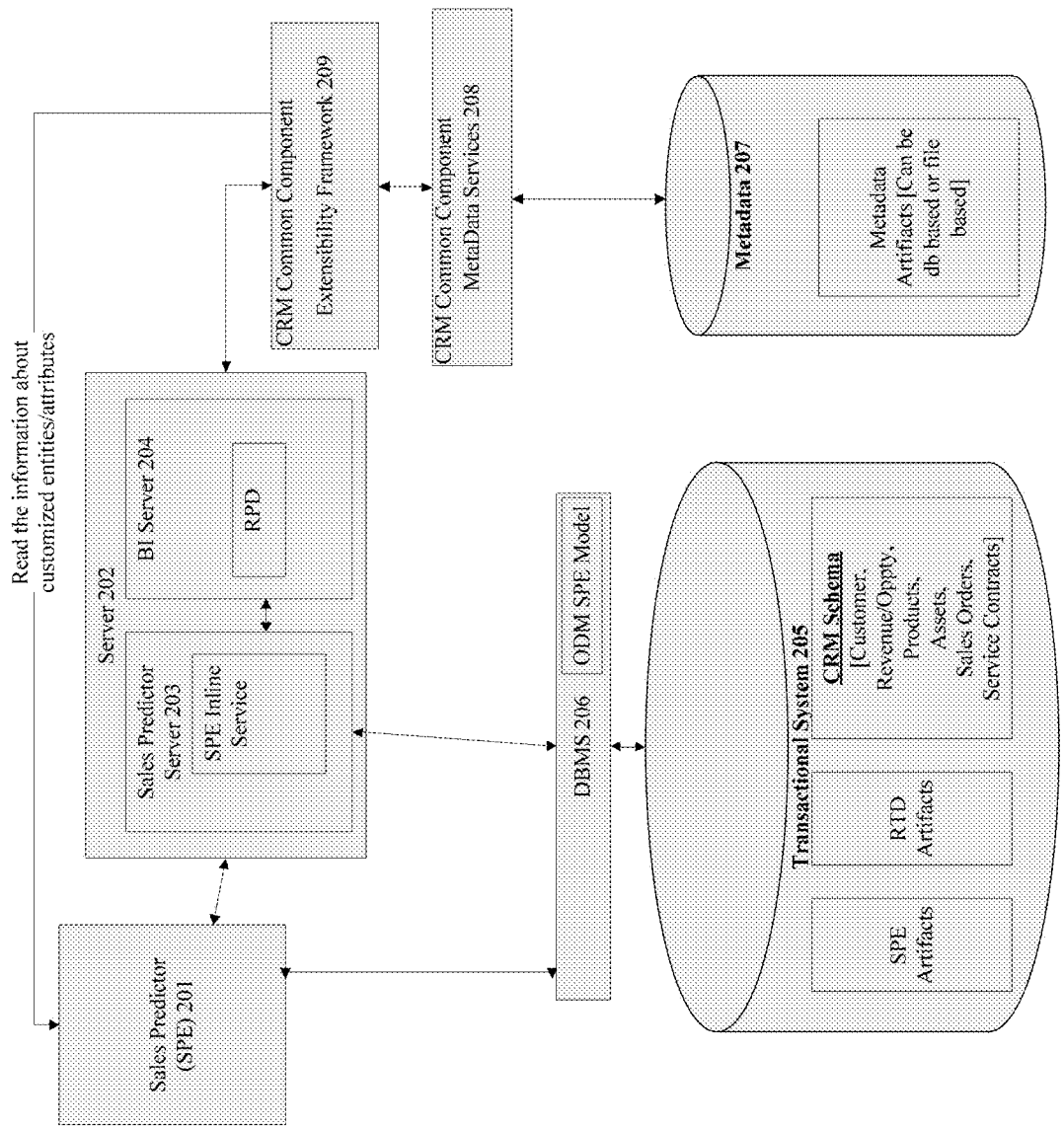
FIGS. 2A-C illustrate systems for implementing some embodiments of the invention.

FIG. 2A illustrates a system in accordance with some embodiments of the invention. SPE 201 may contain communication interface for initiating lead generation, such as a user interface (UI). SPE 201 may also contain a UI for a rules editor for defining new rules, and a model editor for specifying attributes and entities for which to train new models.

SPE 201 interfaces with server 202. Server 202 may be a business intelligence server (such as Oracle Business Intelligence Enterprise Edition). Server 202 contains a sales predictor server 203 comprising the inline services accessed by the UI in SPE 201, such as rules and modeling capabilities, as well as the services for training new models and defining new rules. In some embodiments, sales predictor server 203 may be implemented using the Oracle RTD product.

Entity and attribute data used by the system representing customer data, as well as opportunity and revenue line items, may be stored in a transactional system 205 (such as Fusion OLTP product). In some embodiments, small deployments may use only the transactional system 205. In other embodiments, some data may be stored in transactional system 205, while different data may be stored in other locations, such as in a data warehouse (DWH). The transactional system 205 may communicate with the server 202 through a database management system (DBMS) 206. Transactional system 205 may contain the out of the box schema for various entities (i.e., customer entities), as well as the raw data for those entities. Transactional system 205 may also contain saved models and rules that have been trained or defined by a user.

To retrieve data from the transactional system 205, the user may write database queries specifying the data to be retrieved. However, writing database queries often requires the user to be familiar with the underlying database schema, something that many typical users of sales prediction tools are not familiar with. In addition, such queries may often be restricted to certain systems because the structure of how the data is stored may be different across different systems, such as between transactional systems and data warehouse systems. This may be especially problematic in embodiments where the system stores data in multiple locations, as it may necessitate the user to be familiar with the underlying schema in which the data is stored, as well as where the particular data they wish to access is stored.

To deal with these issues, server 202 may include a business intelligence server 204. Business intelligence server 204 contains a repository definition (RPD), providing an abstraction or presentation layer that maps logical entities and attributes to physical data (i.e., database tables and columns) in the transactional system 205 and/or the database warehouse. The configuration of the RPD specifies where to find the necessary data and how the schema is structured. The user can create logical queries, which are translated automatically by the business intelligence server 204 into physical queries for the transactional system 205 or the database warehouse. In some embodiments, a translation table may be used. The physical queries are used to retrieve the data from where it is stored and send it to the sales predictor server 203, where it can be used to generate leads, train models, and/or create reports. This makes it so that the user is able to retrieve data without needing to know where the data is stored, or be familiar with the underlying schema of the entities and attributes.

Metadata 207 contains the metadata schema defining the extension attributes associated with each entity. For example, the out of the box SPE may associate a "customer" entity with various attributes such as "name," "location," and "industry." Metadata 207 may associate additional extended attributes defined by a user, such as "number of employees" or "province," with the "customer" entity. Metadata 207 may also contain additional data concerning the extended attributes. For example, metadata 207 may specify that a "province" attribute be a string, while a "number of employees" attribute must be a whole number.

To extend an attribute, extensibility framework 209, which contains a metadata services editor 208, is used to edit the metadata schema in metadata 207. Extensibility framework 209 may contain a communications interface, such as a user interface, from which metadata services editor may receive the extended attributes or entities.

In some embodiments, an entity table, such as a customer table, may have a plurality of columns each associated with an out of the box attribute, and also a plurality of extension columns. By editing the metadata 207 to map an extension column of the entity to a new extended attribute, the extended attribute can be added to the entity. For example, in some embodiments, a customer table may contain the columns of "name," "location," and "annual revenue," which corresponds to existing out of the box attributes, as well as a plurality of extension columns. When adding a new extended attribute (e.g., "number of employees"), the metadata 207 may be edited to map the first unused extension column of the customer table to the new attribute.

Once the metadata 207 has been edited, it is necessary for the business intelligence server 204 and SPE 201 to be made aware of the extended attributes, so that new rules, models, and queries can be created based on the extended attributes. Extensibility framework 209 interfaces with business intelligence server 204 and SPE 201, and performs a mapping between entities that are currently used by the business intelligence server 204 and SPE 201 and the entities that have been extended, so that the extended attributes and entities may be utilized. For example, the business intelligence server 204 may map logical representations of customer attributes to the database schema in order to generate physical queries. When extensibility framework 209 updates business intelligence server 204, new mappings may be created that allow for queries to be generated based on the new extended attributes or entities. Similarly, updating the SPE 201 with the extended attributes and entities will update the UI of SPE 201 to allow the user to define rules or initiate training of models based on the extended attributes and entities.

Once the business intelligence server 204 and SPE 201 have been updated with the extended attributes/entities, the user may use the SPE UI to define new rules or train new models based on the extended attributes and entities. After training a new model, the SPE may produce one or more reports with which the user may use to analyze the newly trained model and determine top correlators to be included in the final model.

In some embodiments, a generic design for the SPE UI stores the resource bundle and resource key in the SPE seed data, so that when there is a need to display a certain attribute, then one would look in the tables to determine the label to be displayed. This may be used in localization, so that the attribute displayed to the user in the UI will be in the user's local language.

In some embodiments, including embodiments using a regression model (e.g., RTD), the extension attributes are loaded and the attribute path(s) are added to the correlation drivers. For some embodiments that use a clustering model (e.g., ODM), the table name and column name are defined in seed data that is used for training.

In some embodiments using a regression model (e.g., RTD), the model data is stored within transaction system 205. However, other embodiments, including those using a clustering model (e.g., ODM) may store model data as part of the DBMS 206.

In some embodiments, on the SPE UI side (Select metadata), one would use the APIs provided by the Extensibility framework to look up the label based on the resource bundle and key already present in the seed data.

In some embodiments, for RTD model reports there is a mapping from the attribute in the model snapshot to the seed data in a translation table (referred to herein as "ZSP_MOD-EL_INPUTS"). For ODM reports, the attribute details are captured in the ZSP_MODEL_INPUTS table.

As shown in FIG. 2A, at the customer relationship management (CRM) level, one embodiment supports a lite version with only a transactional system, which may be, for example, the Fusion OLTP product, available from Oracle Corporation of Redwood Shores, Calif.

Figure 2B:
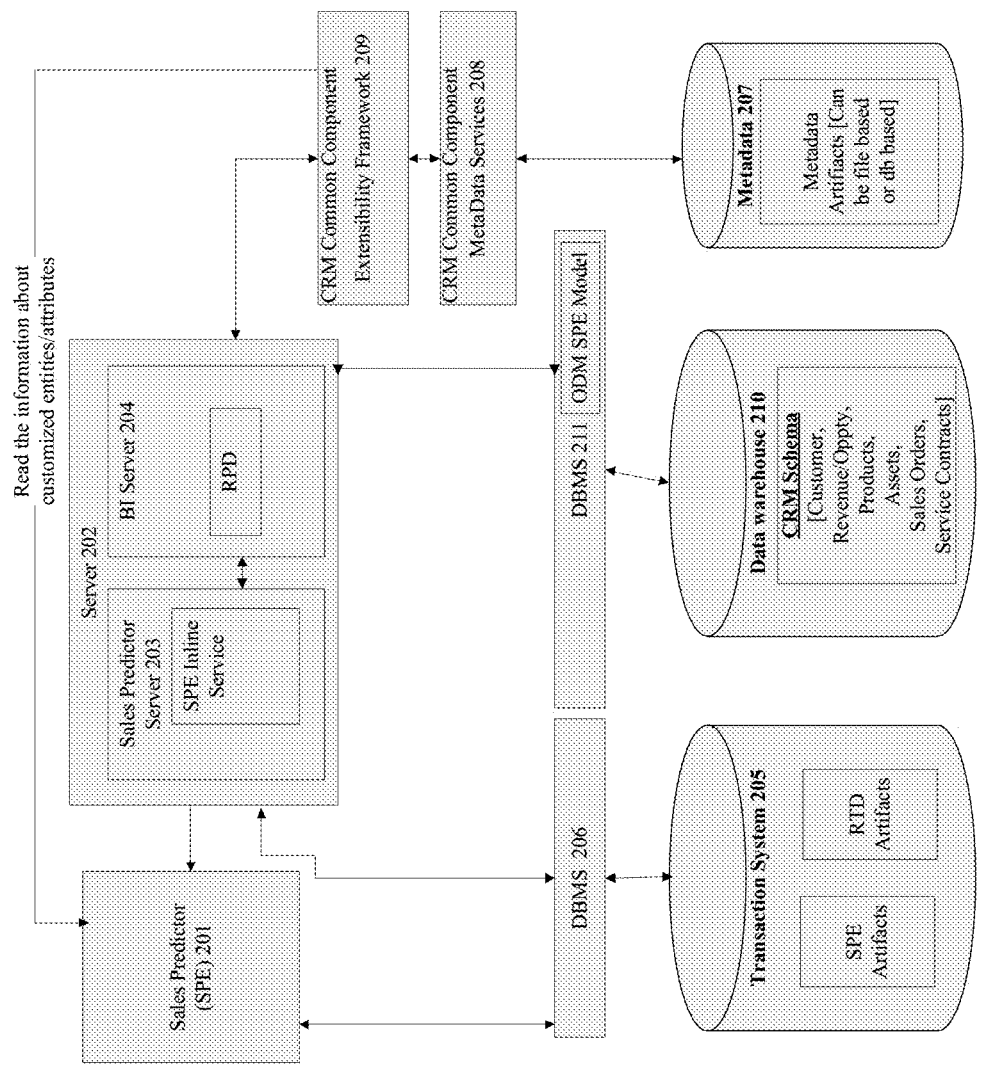

As shown in FIG. 2B, disclosed is an approach for a full-fledged application with data warehouse support. A data warehouse is a storage system used in many reporting and data analysis applications for storing historical data, and may be used when the transactional system is not large enough to store all of the necessary data. The system in FIG. 2B may store models and rules data in the transactional system 205, while the entity and attribute data, including customer, opportunity, and revenue data, may be stored in the data warehouse 210. The data warehouse 210 may interface with business intelligence server 204 and the RPD through its own DBMS 211.

Figure 2C:
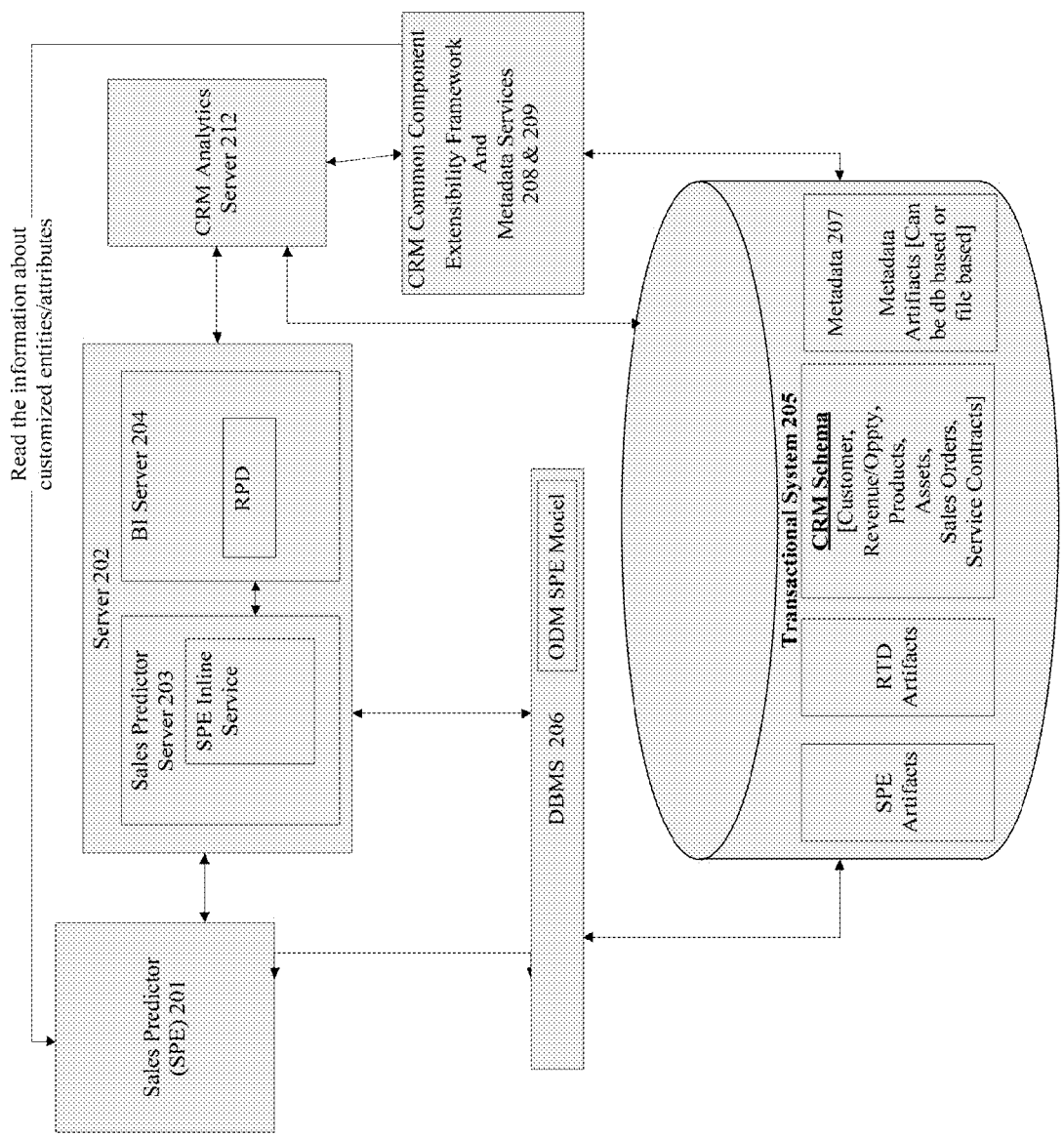

FIG. 2C illustrates Sales Predictor's use of the extensibility framework wherein the metadata is located inside the transactional system 205, such as in systems using the Oracle Transactional Business Intelligence (OTBI) software. Metadata 207 is located within transactional system 205. Extensibility framework 209 is used to update SPE 201 with the extended attributes and entities.

In some embodiments, an analytics server 212 (e.g., a CRM analytics server) may be used to update the mappings of the extended attributes and/or entities to labels in the RPD. This may be required in some embodiments using only a transactional system, wherein the analytics server 212 is used to deploy objects (such as Java objects) mapped to transactional objects in the transactional system 205. The presentation layer used by the RPD may then map to the objects deployed in the analytics server 212.

Figure 3:
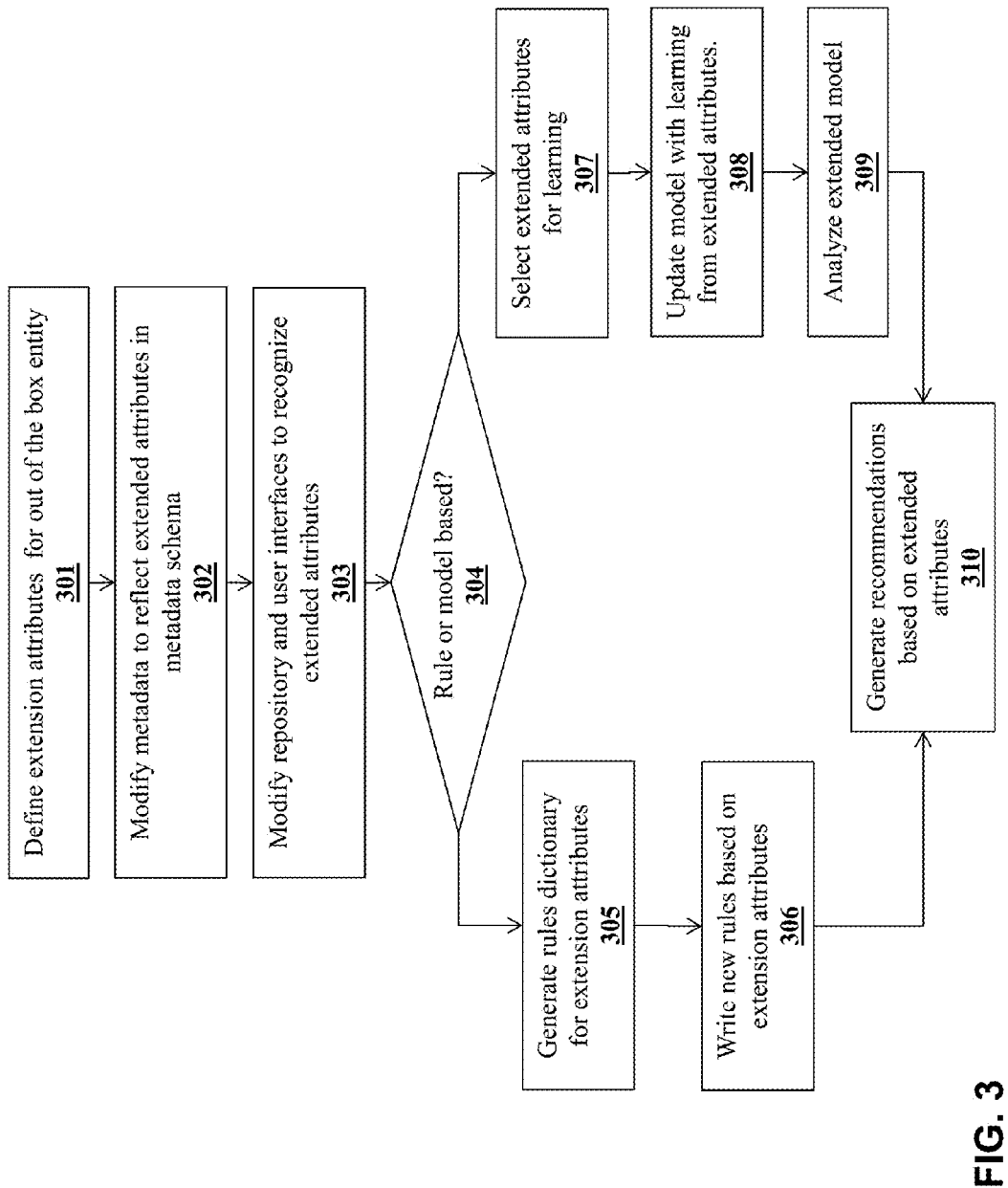
FIG. 3 illustrates a flowchart for a process for extending attributes for a sales prediction engine in accordance with some embodiments of the invention.

FIG. 3 illustrates a flowchart for extending attributes and generating leads using the newly extended attributes/entities in accordance with some embodiments of the invention. First, at 301, extension attributes/entities are defined. For example, a sales analyst may determine that it would be useful to have models and rules based upon a customer attribute that was not included as part of the out of the box functionality of the system. The sales analyst may use a UI provided by an extensibility framework to specify the properties of the new attribute or entity.

At 302, the metadata of the extended entity is modified to reflect the extended attributes. In some embodiments, an entity may have, in addition to fields for out of the box attributes, a plurality of extension fields. Modifying the metadata schema of the system may comprise mapping the extension fields of the entity to the newly defined attribute. For example, a customer entity may be represented by a table where each column represents an attribute. In addition to columns corresponding to out of the box attributes, the customer table may have a plurality of extension columns. If a new attribute is to be added to the customer entity, one of the extension columns may be mapped to the new attribute. Additional extended attributes may be mapped to additional unused extension columns.

At 303, the repository definition and the sales predictor engine are modified as needed to recognize the newly extended attribute/entity. For example, the sales predictor engine user interface may contain a drop-down menu from which a user may select an attribute or entity when writing rules or training a model. Modifying the sales predictor engine adds the new attribute/entity to the menu of attributes/entities that the user can select, allowing the sales predictor engine to correctly associate the added attributes or entities with existing attributes and entities in the data model. Modifying the repository definition maps the logical representation of the extended attribute with its underlying metadata schema, allowing the repository to correctly process logical queries from the user based on the new attributes/entities.

Once the repository definition and sales predictor engine have been modified, new rules and models may be created based on the new attributes and entities, and used to generate leads and recommendations based on the new attributes. First, at 304, it is determined whether the system is rules-based or model-based. In some embodiments, the sales predictor engine may utilize both rules and models, in which case the steps for rules-based and model-based systems may both be performed.

For rules-based systems, a rules dictionary that incorporates the newly extended attributes and/or entities into its data model is generated at 305. This allows for new rules to be written based on the extended attributes/entities at 306. This may be performed by a user at a user terminal using the sales predictor engine UI which has been updated to recognize the extended attributes and/or entities.

For model-based systems, in order to generate leads based on a model, the model must first be trained with the extended attributes and entities. This may be accomplished by analyzing historical data associated with the extended attributes and entities, and applying mathematical models such as a linear regression model to calculate correlations between products and the extended attributes and entities. At 307, extended attributes and entities are selected for training. This can be done by the user using the interface at the sales predictor engine, which has been updated to recognize the extended attributes and entities. In some embodiments, this selection may be done automatically for all extended attributes and entities defined by the user at 301. At 308, training is performed by the system. The SPE queries the data in order to train the model based on the selected attributes and entities, forming correlations between products and retrieved attributes and entities. When training is completed, an updated model is produced that is trained on both the pre-existing entities and attributes and the newly extended entities and attributes.

At 309, the updated model may be analyzed. In some embodiments, the SPE may generate one or more reports after the completion of training. A sales analyst may view these reports to determine which attributes in the model have a strong correlation to a product and should be used by the SPE to generate recommendations for those products, and which ones have a weak correlation and are not suitable for inclusion in the final model. The completed model may be saved after analysis.

At 310, the sales predictor engine may be used to generate recommendations based on the extended attributes or new entities, by using the newly defined rules and/or the newly trained models.

Process Flow

Figure 4:
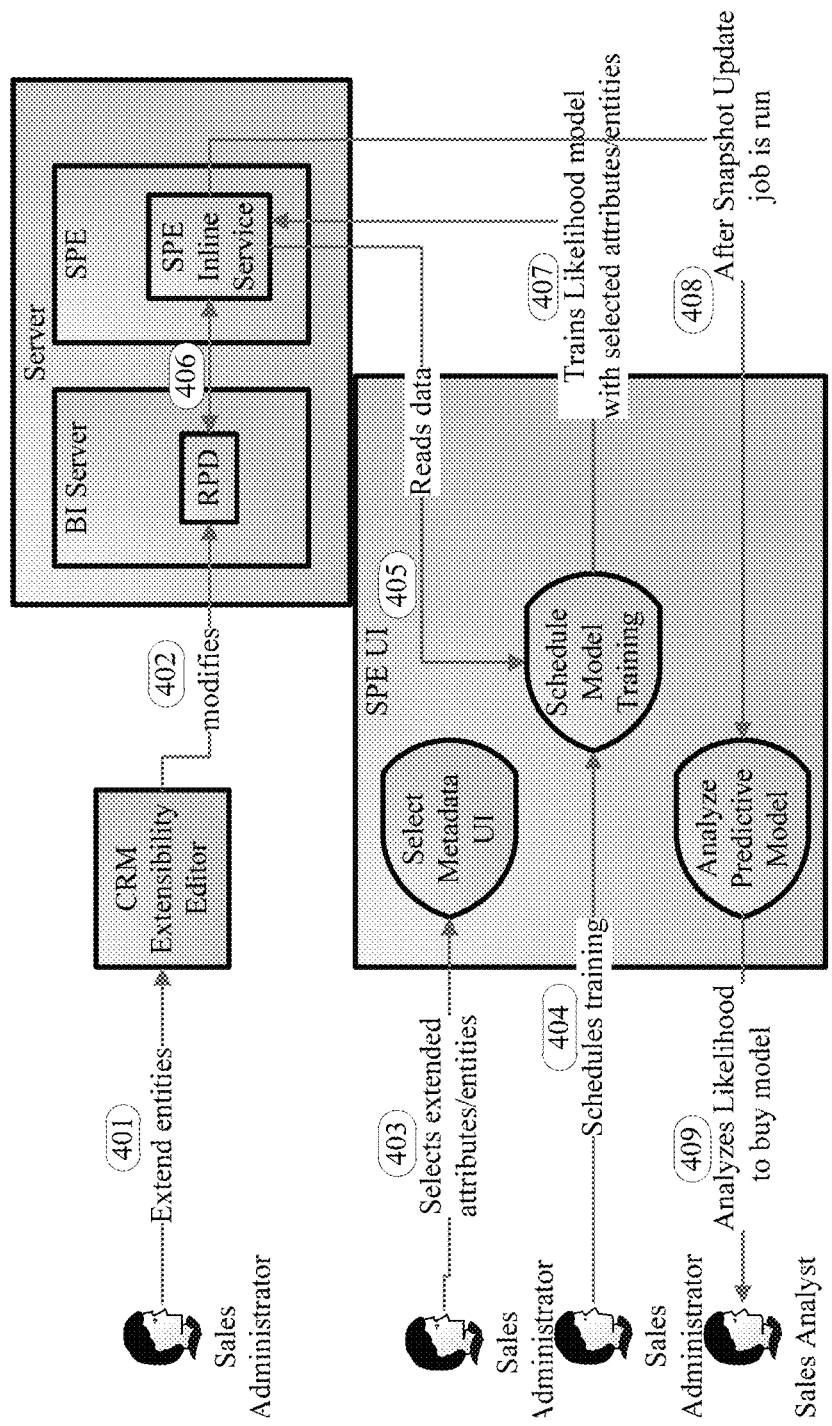
FIG. 4 illustrates a process for extending attributes for a sales prediction engine in accordance with some embodiments of the invention.

FIG. 4 shows a process flow of the user extending attributes and a specific use case of how it flows through in SPE to the Analyze Predictive model UI.

At 401, a sales admin uses an extensibility editor to extend the desired attributes/entities. The extensibility editor, in response to inputs by the sales admin, and modifies the metadata schema (not shown in figure) accordingly. For example, the extensibility editor may add an extended attribute by modifying the metadata schema to map an extension field of an entity to the new attribute specified by the sales admin.

At 402, the extensibility editor modifies the RPD to include the extended attributes/entities specified by the sales admin at 401. In some embodiments, this is done by mapping the logical entities used by the SPE to the extended attributes and/or entities in the metadata schema. This allows the RPD to accept logical queries based on the extended attributes/entities and translate them to physical queries to retrieve the data.

When an entity is extended, information on the extended attributes/entities may be read in as well and the data is modified in the database. The modified entity and attribute definitions may be saved in the extensibility metadata schema. In some embodiments, the selecting of entities and attributes for model training need not involve interaction with model, just the extensibility framework. In some embodiments, the information may be accessed on the extended entities/attributes by the sales predictor (e.g. getExtendedAttributes("Customer")//This is in the context of SPE).

Before an SPE can make use of extended attributes and entities as part of models, the extended attributes and entities must first be trained. At 403, a sales administrator uses the Select Model Attributes and Entities UI (also called the Select Metadata UI) to select the newly extended attributes/entities for learning. The Select Model Entity and Attributes UI has the system read the information on the attributes and entities to learn on from the database, which is seeded to take a set of pre-defined attributes and entities. The end user can then add from the list of available attributes. Because the RPD has been modified to include the extended attributes/entities, the extended attributes/entities will be available for selection by the user.

Next, at 404, the sales administrator schedules a training with the attributes/entities that were selected at 403. At 405, the model training process reads data about the attributes/entities to learn on. Logical queries may be sent to the RPD at 406, which translates them to physical queries in order to retrieve the data.

In some embodiments, subject areas are used in the RPD that correspond to tables in the database mapped through the abstraction or presentation layer. For example, a user can use a "CRM—Sales Predictor Input" subject area in the SPE UI. Under that subject area, attributes such as Customer, Product, Revenue, Asset, Agreement, Order Item Revenue Facts, and Service Request Facts are read from the database and mapped to the above entities in the RPD.

During training, the inline service determines which attributes are turned on for learning and may access the selected attributes. When an entity, e.g., customer, is extended (i.e. added attributes), then the inline service is to know about the extended attributes. In some embodiments, from the extensibility side, the sales predictor is able to query into the extensibility framework to get the information on the extended entity.

At 407, the SPE inline service performs training on the retrieved data, creating a likelihood model with the selected attributes/entities. The inline service may use a mathematical regression model, or any other correlation technique. The end result is that there is a model that is trained with the regular as well as extended attributes and entities. In some embodiments, clustering models (e.g. ODM) are built using PL/SQL scripts. When the model is built, information is obtained from the extensibility framework on the extended attributes/entities.

At 408, data is transferred from the newly trained model so that it can be viewed as reports. In some embodiments, this may be done with a batch job (e.g., a SnapshotUpdate job). The model insight reports are primarily affected by the training data inserted in reports database tables by the SnapshotUpdate batch job. The system determines how the sales predictor intends to address the extended attributes/entities.

At 409, the Sales Analyst looks at the trained predictive model and analyses the data. The Sales Analyst may view the reports at an Analyze Predictive Model UI provided by the SPE. In some embodiments, the Sales Analyst may specify which product-attribute correlations to include in the final model to be used to generate recommendations. For example, the Sales Analyst may select only the attributes and/or entities having high correlations to be used in the final model, while low correlations may be left out of the model.

SPE Subject Areas in the Repository (RPD):

In some embodiments, the SPE UI may have different subject areas that map to tables in the underlying database. Table columns in the database may be exposed as subject areas in the RPD presentation layer. For example, in some embodiments, the "CRM—Sales Predictor Input" subject area may be used to specify entities and attributes for learning. The "CRM—Sales Predictor ROI Reports" subject area show the metrics (Lead+Opportunity Revenue) that result from training a model. The "CRM—Sales Predictor Sales Estimation Analysis" subject area show the output of the ODM model. "RTD—Model Analysis" may show snapshot details from the RTD model. "Sales Predictor Output" may show the correlation drivers.

Detailed Design for Some Embodiments:

In some embodiments, tables may be extended to support table name and column name columns. This will support both the SPE UI and ODM model creation. A translation table will contain the label name. The seed data will have both out of the box attributes and the extensible attributes. Both the transactional system and data warehouse versions are taken care of for seed data.

In some embodiments of the Select Metadata UI, the extensibility API is called every time the UI is rendered to check that the label has not changed and to populate a translation table with the correct label. For example, attributes with the 'Y' in the ACTIVE_FLAG_field are shown under 'Selected Attributes' for training. For the ones with 'N' in the flag, it is displayed in the 'Available Attributes.' For the ones with the 'E' flag, the extensibility API will be called to figure out whether this column has been extended and then change it to 'N.'

The extensibility API may take a table name and return the list of extended attributes, along with their labels. For example, the API may receive a command getLabels ("ZCA_SALES_ACCOUNTS") that returns all the sales account attributes that have been extended with their labels. The translation table will then be populated with the correct labels.

In some embodiments, RTD Model internally uses the repository presentation layer attributes to train on. The extension attributes are used in the entities. At runtime, depending on the setting in the "Select Metadata" UI, these attributes will be used for learning. In some embodiments, the ODM model will use the settings in the translation table to train the models. In this case, both RTD and ODM models will be in sync.

In some embodiments, for the SPE reports that read from the RTD snapshot tables, these again will have to read from ZSP_MODEL_INPUTS translation table for the labels to display in the UI.

Extensibility Support with Multi-Tenancy

The extensibility system may also be applied to systems with multi-tenancy. In multi-tenancy systems, all the SPE use cases are affected, since all of them need to pick the tenant specific data. In these systems, the Select Metadata UI will use tenant specific attributes/entities. Batch Training and Batch Prediction may support tenant specific criteria [i.e. attributes and entities]. Learning should pick up tenant customizations.

When generating recommendations, a territory web service should pick up customers in a territory specific to a tenant. Explanations should show tenant customizations in terms of top correlated attributes.

During ODM training on-tenant specific attributes and entities, a SnapshotUpdate job needs to update RTD schema with the extended attributes, if they are top correlators. For rules, the SPE Rules Editor will support tenant specific attributes/entities.

Model Simulation showing tenant specific attributes/entities. Model reports based on the tenant showing extended attributes/entities. Some embodiments will contain an eligibility web service that is customizable by tenants.

System Architecture Overview

Figure 5:
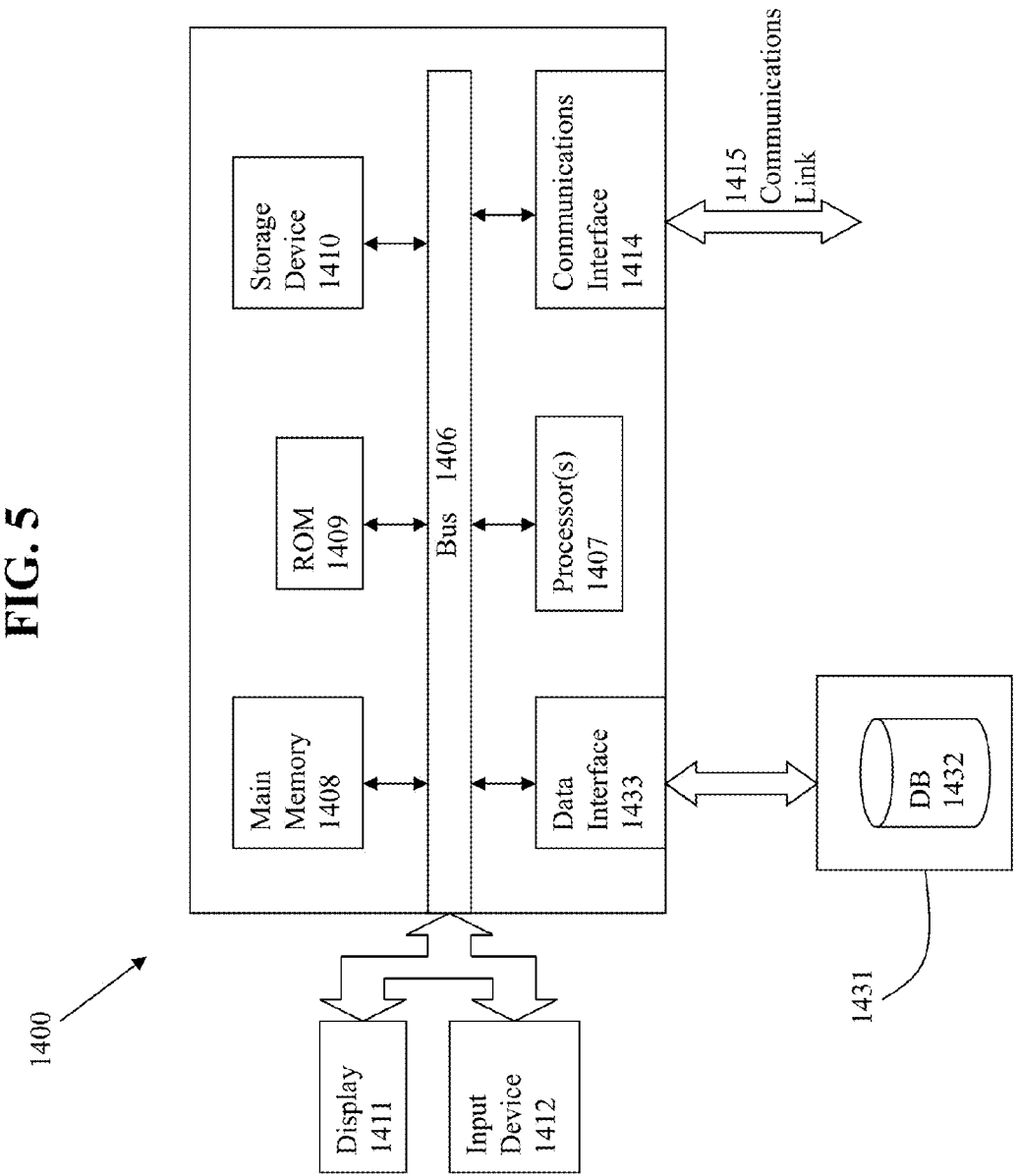
FIG. 5 illustrates a computerized system on which an embodiment of the invention can be implemented.

FIG. 5 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A non-transitory computer readable medium having instructions which, when executed by a processor, causes the processor to perform a process for extending attributes for a predictive analysis engine, the process comprising:
   defining one or more extended attributes of a database entity,
      the database entity corresponding to a database table, the database table comprising one or more original attribute columns and one or more unused extension columns for the database entity, the one or more unused extension columns providing extensibility of the database entity for the one or more extended attributes not defined in the one or more original attribute columns of the database table of the database entity;
   receiving from an interface a definition of the one or more extended attributes for the database entity;
   modifying a metadata schema of the database table using the one or more extended attributes, comprising:
      modifying a first version of the database entity to a second version of the database entity, the second version of the database entity comprising the one or more extended attributes that do not exist in the first version, by:
         reviewing the one or more unused extension columns for the first version of the database entity, identifying unused extension columns from among the one or more unused extension columns of the database table for the first version of the database entity, and editing the metadata schema for the database table to map the identified unused extension columns from the database table to the one or more extended attributes to generate the second version of the database entity within the database table;

recognizing, by the predictive analysis engine, the one or more extended attributes of the database entity; and executing the predictive analysis engine to generate recommendations based at least in part on the one or more extended attributes by using one or more new rules or one or more new models, the one or more new rules or the one or more new models comprise the one or more extended attributes.

2. The non-transitory computer readable medium of claim 1, the process further comprising:

identifying the one or more extended attributes to a business intelligence server, wherein a mapping is performed in the business intelligence server to correlate a logical representation of the database entity to the metadata schema of the database table for the second version of the database entity to create database queries to include the one or more extended attributes; and interfacing with the predictive analysis engine to perform predictive analysis using the one or more extended attributes and data for the one or more extended attributes retrieved with the database queries created in the business intelligence server.

3. The non-transitory computer readable medium of claim 1, wherein the one or more new rules identify characteristics of customers that are more likely to lead to a sale of a particular product.

4. The non-transitory computer readable medium of claim 1, wherein the one or more extended attributes is a province attribute.

5. The non-transitory computer readable medium of claim 1, wherein the one or more extended attributes support extended metrics and multi-tenancy.

6. The non-transitory computer readable medium of claim 1, wherein data for the predictive analysis engine is stored in a transactional system.

7. The non-transitory computer readable medium of claim 1, wherein data for the predictive analysis engine is stored in both a transactional system and a data warehouse.

8. The non-transitory computer readable medium of claim 6, wherein the transactional system comprises an "out of the box" schema for various entities.

9. The non-transitory computer readable medium of claim 6, wherein the transactional system stores saved models and rules previously trained or defined by a user.

10. The non-transitory computer readable medium of claim 1, wherein the predictive analysis engine generates reports based at least in part on the one or more extended attributes via view objects.

11. The non-transitory computer readable medium of claim 2, wherein the business intelligence server comprises a repository definition that provides an abstraction layer that maps logical entities and attributes to physical data.

12. The non-transitory computer readable medium of claim 7, wherein models and rules data are stored in the transactional system and entities and attributes data are stored in the data warehouse.

13. The non-transitory computer readable medium of claim 1, the process further comprising generating a rules dictionary that incorporates the one or more extended attributes.

14. The non-transitory computer readable medium of claim 1, the process further comprising training the one or more new models with the one or more extended attributes by:

analyzing historical data associated with the one or more extended attributes, and applying mathematical models to calculate correlations between products and the one or more extended attributes.

15. The non-transitory computer readable medium of claim 14, wherein the mathematical models comprise a linear regression model to calculate the correlations.

16. The non-transitory computer readable medium of claim 1, wherein a user interface of the predictive analysis engine comprises a select metadata user interface and a rules user interface, the select metadata user interface displaying the one or more extended attributes for selection and training, the rules user interface is used for creating and editing rules.

17. The non-transitory computer readable medium of claim 16, wherein the select metadata user interface selects the one or more extended attributes for learning.

18. The non-transitory computer readable medium of claim 1, wherein the one or more extended attributes for the database entity is associated with a customer entity and wherein the predictive analysis engine is a sales prediction engine.

19. A computer-based method, executed by a processor, for extending attributes for a predictive analysis engine, comprising:

defining one or more extended attributes of a database entity, the database entity corresponding to a database table, the database table comprising one or more original attribute columns and one or more unused extension columns for the database entity, the one or more unused extension columns providing extensibility of the database entity for the one or more extended attributes not defined in the one or more original attribute columns of the database table of the database entity;

receiving from an interface a definition of the one or more extended attributes for the database entity;

modifying a metadata schema of the database table using the one or more extended attributes, comprising:

modifying a first version of the database entity to a second version of the database entity, the second version of the database entity comprising the one or more extended attributes that do not exist in the first version, by:

reviewing the one or more unused extension columns for the first version of the database entity, identifying unused extension columns from among the one or more unused extension columns of the database table for the first version of the database entity, and editing the metadata schema for the database table to map the identified unused extension columns from the database table to the one or more extended attributes to generate the second version of the database entity within the database table;

recognizing, by the predictive analysis engine, the one or more extended attributes of the database entity; and executing the predictive analysis engine to generate recommendations based at least in part on the one or more extended attributes by using one or more new rules or one or more new models, the one or more new rules or the one or more new models comprise the one or more extended attributes.

20. A computer-based system for extending attributes for a predictive analysis engine, comprising:
    a computer processor to execute a set of program code instructions;
    a memory to hold the set of program code instructions, in which the set of program code instructions comprises program code to:
        define one or more extended attributes of a database entity,
            the database entity corresponding to a database table, the database table comprising one or more original attribute columns and one or more unused extension columns for the database entity, the one or more unused extension columns providing extensibility of the database entity for the one or more extended attributes not defined in the one or more original attribute columns of the database table of the database entity;
        receiving from an interface a definition of the one or more extended attributes for the database entity;
        modify a metadata schema of the database table using the one or more extended attributes, comprising:
            modifying a first version of the database entity to a second version of the database entity, the second version of the database entity comprising the one or more extended attributes that do not exist in the first version, by:
                reviewing the one or more unused extension columns for the first version of the database entity,
                identifying unused extension columns from among the one or more unused extension columns of the database table for the first version of the database entity, and
                editing the metadata schema for the database table to map the identified unused extension columns from the database table to the one or more extended attributes to generate the second version of the database entity within the database table;
        recognize, by the predictive analysis engine, the one or more extended attributes of the database entity; and
        execute the predictive analysis engine to generate recommendations based at least in part on the one or more extended attributes by using one or more new rules or one or more new models, the one or more new rules or the one or more new models comprise the one or more extended attributes.

\* \* \* \* \*

UNITED STATES PATENT AND TRADEMARK OFFICE
CERTIFICATE OF CORRECTION

| | |
|---|---|
| PATENT NO. | : 9,953,331 B2 |
| APPLICATION NO. | : 15/362764 |
| DATED | : April 24, 2018 |
| INVENTOR(S) | : Yaseen et al. |

It is certified that error appears in the above-identified patent and that said Letters Patent is hereby corrected as shown below:

In the Drawings

On sheet 2 of 7, in FIG. 2A, under Reference Numeral 207, Line 2, delete "Artifiacts" and insert -- Artifacts --, therefor.

On sheet 3 of 7, in FIG. 2B, under Reference Numeral 207, Line 2, delete "Artifiacts" and insert -- Artifacts --, therefor.

On sheet 4 of 7, in FIG. 2C, under Reference Numeral 207, Line 2, delete "Artifiacts" and insert -- Artifacts --, therefor.

In the Specification

In Column 10, Line 58, delete "ACTIVE_FLAG_field" and insert -- ACTIVE_FLAG field --, therefor.

In Column 12, Line 17, delete "PTSN," and insert -- PSTN, --, therefor.

Signed and Sealed this
Twentieth Day of November, 2018

Andrei Iancu
*Director of the United States Patent and Trademark Office*